(12) United States Patent
Sawada

(10) Patent No.: US 7,170,654 B2
(45) Date of Patent: Jan. 30, 2007

(54) CONTACT-TYPE IMAGE SENSOR FOR RECIPROCALLY MOVABLE DOCUMENT SHEET

(75) Inventor: Hideki Sawada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 713 days.

(21) Appl. No.: 10/238,920

(22) Filed: Sep. 9, 2002

(65) Prior Publication Data

US 2003/0072041 A1   Apr. 17, 2003

(30) Foreign Application Priority Data

Sep. 10, 2001   (JP)   ............................. 2001-273501

(51) Int. Cl.
*H04N 1/04* (2006.01)

(52) U.S. Cl. ...................... 358/483; 358/474; 358/496; 358/498; 250/208.1

(58) Field of Classification Search ................ 358/482, 358/483, 496, 498, 474, 494, 484, 475, 471, 358/400, 512–514, 505, 509, 472; 399/374, 399/364; 355/23, 26; 382/312, 318, 319; 250/208.1, 239, 216, 234–236

See application file for complete search history.

(56) References Cited

U.S. PATENT DOCUMENTS

| | | | | |
|---|---|---|---|---|
| 5,038,027 A | * | 8/1991 | Ioka | ........................ 250/208.1 |
| 5,206,745 A | * | 4/1993 | Yamada et al. | ............. 358/498 |
| 5,233,178 A | * | 8/1993 | Tokunaga | ................ 250/208.1 |
| 5,399,850 A | * | 3/1995 | Nagatani et al. | ......... 250/208.1 |
| 5,434,682 A | * | 7/1995 | Imamura et al. | ............ 358/474 |
| 6,147,778 A | * | 11/2000 | Yamada et al. | ............. 358/474 |
| 6,166,832 A | * | 12/2000 | Fujimoto | .................... 358/484 |
| 6,239,421 B1 | * | 5/2001 | Nagata et al. | ........... 250/208.1 |
| 6,548,799 B1 | * | 4/2003 | Matsumoto | .............. 250/208.1 |

FOREIGN PATENT DOCUMENTS

JP   05-344276   12/1993

\* cited by examiner

*Primary Examiner*—Cheukfan Lee
(74) *Attorney, Agent, or Firm*—Hamre, Schumann, Mueller & Larson, P.C.

(57) ABSTRACT

A contact-type image sensor includes a case having an upper surface formed with an opening, a cover glass closing the opening and providing a linear reading region extending in the primary scanning direction. A sheet as an object to be read, coming into contact with the linear reading region, is reciprocally moved in the secondary scanning direction which is perpendicular to the primary scanning direction. The opening is defined by a pair of edges of the case spaced in the secondary scanning direction. Each of the edges includes a convex surface having a top positioned above the outer surface of the cover glass.

11 Claims, 5 Drawing Sheets

CONTACT-TYPE IMAGE SENSOR FOR RECIPROCALLY MOVABLE DOCUMENT SHEET

BACKGROUND OF THE INVENTION

1. Field of the Invention

The present invention relates to a contact-type image sensor used for reading an image on an object to be read. Further, the present invention relates to a contact-type image sensor wherein a sheet as an object to be read, coming into contact with a linear reading region, is reciprocally movable in a secondary scanning direction.

2. Description of the Related Art

As is well known, a copying machine and a scanner is used as an apparatus having a function of reading an image (including characters and symbols). Such an apparatus generally has an image sensor with a linear reading region.

FIG. 6 illustrates a typical structure of an image sensor used in the apparatus. The image sensor 100 which is a contact-type image sensor, is provided with a linear reading region 10 of a predetermined length. As shown in FIG. 7, the linear reading region 10 is provided on an upper surface 2a of a cover glass 2 mounted on an upper portion of a case 101. The image sensor 100 can read an image on the surface of the sheet P as an object to be read with the structure in which the sheet P moves while coming into contact with the linear reading region 10.

The sensor 100 is placed, for example, in a transfer base 109. The sheet P is transferred in a first direction $d_1$ (a forward direction). The sensor 100, as shown in FIG. 7, is provided with a platen roller 8 pressing the sheet P against the linear reading region 10. In the sensor 100, the side wall 101a of the case 101 which is placed upstream in the forward direction projects above an upper surface 2a of the cover glass 2, whereas the downstream side wall 101b is arranged below the upper surface 2a of the cover glass 2.

In operation, the sheet P, moving toward the sensor 100 on the transfer base 109, abuts the side wall 101a. Consequently, the sheet P is slightly lifted by an inclined slope $101a_1$. Coming adjacent the linear reading region 10, the sheet P is pressed against the linear reading region 10 by the rotating platen roller 8. Thus, an image on the surface of the sheet P can be read successively. After passing by the linear reading region 10, the sheet P is transferred from the cover glass 2 onto the transfer base 109.

In this way, the sheet P's movement without touching anything but the reading region 10 may reduce the friction caused by transferring and the generation of static electricity caused by the friction. This may increase the transfer speed of the sheet P and may avoid the sheet P's deviation from the transfer path.

When the sensor 100 is used for reading the images on both sides of the sheet P, it is necessary for the sheet P to be turned over and to be transferred in a backward direction $d_2$ which is reverse of the forward direction $d_1$. Under such circumstances, in the sensor 100 with the structure as shown in FIGS. 6 and 7, the sheet P is prevented from moving in the backward direction $d_2$ by an edge 2b of the cover glass 2 and an inside face 101a' of the side wall 101a of the case 101. This may bend or tear the sheet P, and may prevent the images on both sides of the sheet P from being properly read.

DISCLOSURE OF THE INVENTION

It is therefore an object of the present invention to provide a contact-type image sensor on which a sheet as an object to be read is smoothly and reciprocally movable in a secondary scanning direction of a linear reading region while coming into contact with the linear reading region.

The image sensor provided with the present invention comprises an upper surface formed with an opening and a cover glass which closes the opening and provides a linear reading region extending in a primary scanning direction. A sheet as an object to be read, coming into contact with the linear reading region, is reciprocally movable in a secondary scanning direction which is perpendicular to the primary scanning direction. The opening is defined by a pair of edges spaced in the secondary scanning direction. Each edge includes a convex surface having a top which is positioned above an outer surface of the cover glass.

According to the above-described arrangement, the convex surface of each edge helps smoothly transferring of the sheet. Further, since the outer surface of the cover glass is arranged below the convex surface of each edge, the sheet is not obstructed by the cover glass when transferred from each edge onto the cover glass.

The convex surface of each edge extends up to a position below the outer surface of the cover glass. This can transfer the sheet smoothly onto the convex surface of each edge. The convex surface of each edge has an arcuate cross section for example.

According to the preferable embodiment of the invention, each edge includes a plurality of recesses which are open away from the glass cover and are arranged at a predetermined interval in the primary scanning direction. Each of the recesses may be also open upwardly.

In the use of the contact-type image sensor of the present invention, the case is placed in a transfer base having a transfer surface upon which the sheet is supported in its transferring. At this time, the top of each edge is positioned above the transfer surface. Preferably, the convex surface of each edge extends up to a position below the transfer surface. This arrangement smoothly transfers the sheet from each edge onto the transfer surface.

According to the preferable embodiment, the transfer surface is provided with upper surfaces of guide projections which are spaced at a predetermined interval in the primary scanning direction. This arrangement reduces an area of the friction between the sheet and the transfer surface, which helps more smoothly transferring of the sheet.

Preferably, each of the edges is provided with a plurality of recesses engaging with the guide projections. In addition, it is also preferable that the upper surface of each guide projection in the engagement with a corresponding recess is positioned below the top of the convex surface of the edge.

Other objects, features and advantages of the present invention will become clearer from the description of the preferred embodiment given below with reference to the accompanying drawings.

DETAILED DESCRIPTION OF THE PREFERRED EMBODIMENTS

Preferred embodiments of the present invention will be described below with reference to the accompanying drawings.

Figure 6:
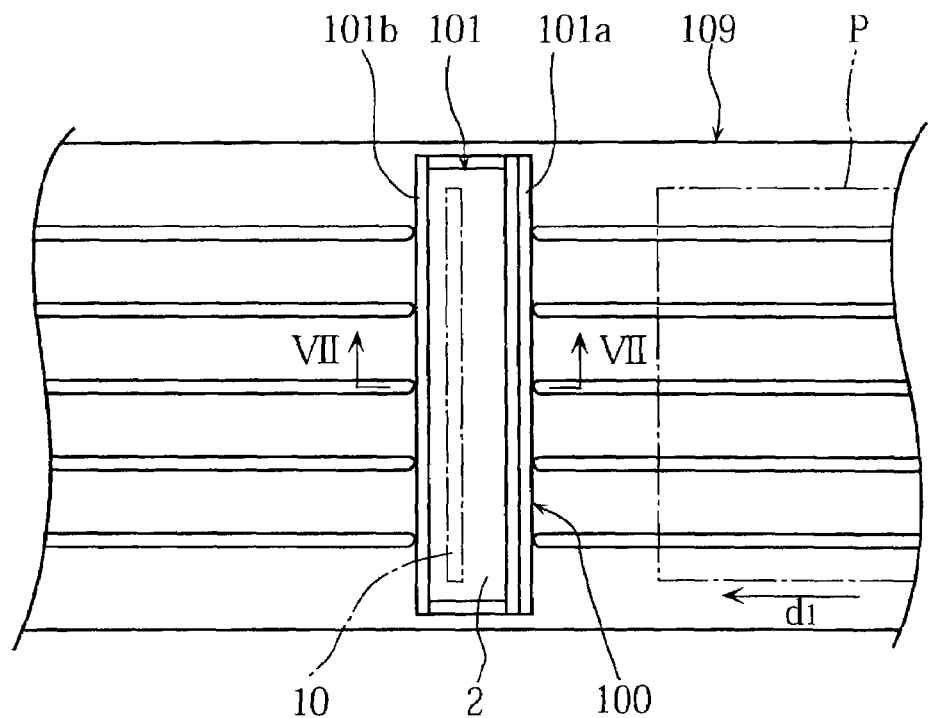
FIG. 6 is a rough plan view showing an example of prior art contact-type image sensor.
Figure 7:
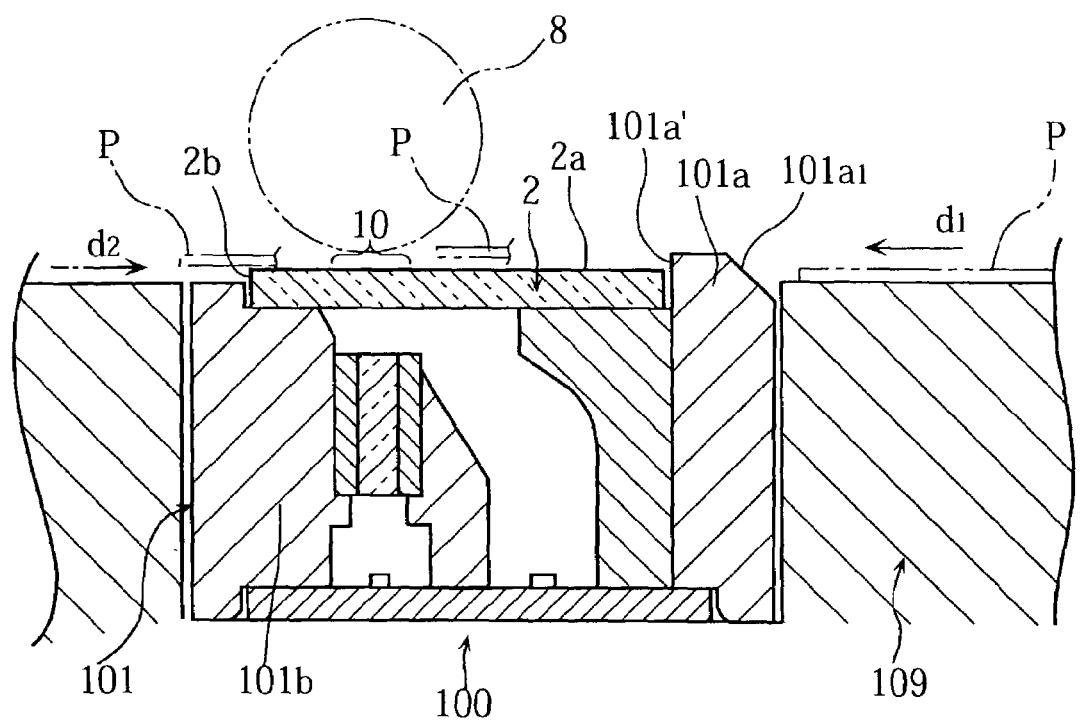
FIG. 7 is a sectional view taken along lines VII—VII shown in FIG. 5.

FIGS. 1 through 5 illustrate a contact-type image sensor according to a preferable embodiment of the present invention. In these figures, the same references are used for designating the same elements as those shown in FIGS. 6 and 7 which illustrate the prior art image sensor.

Figure 1:
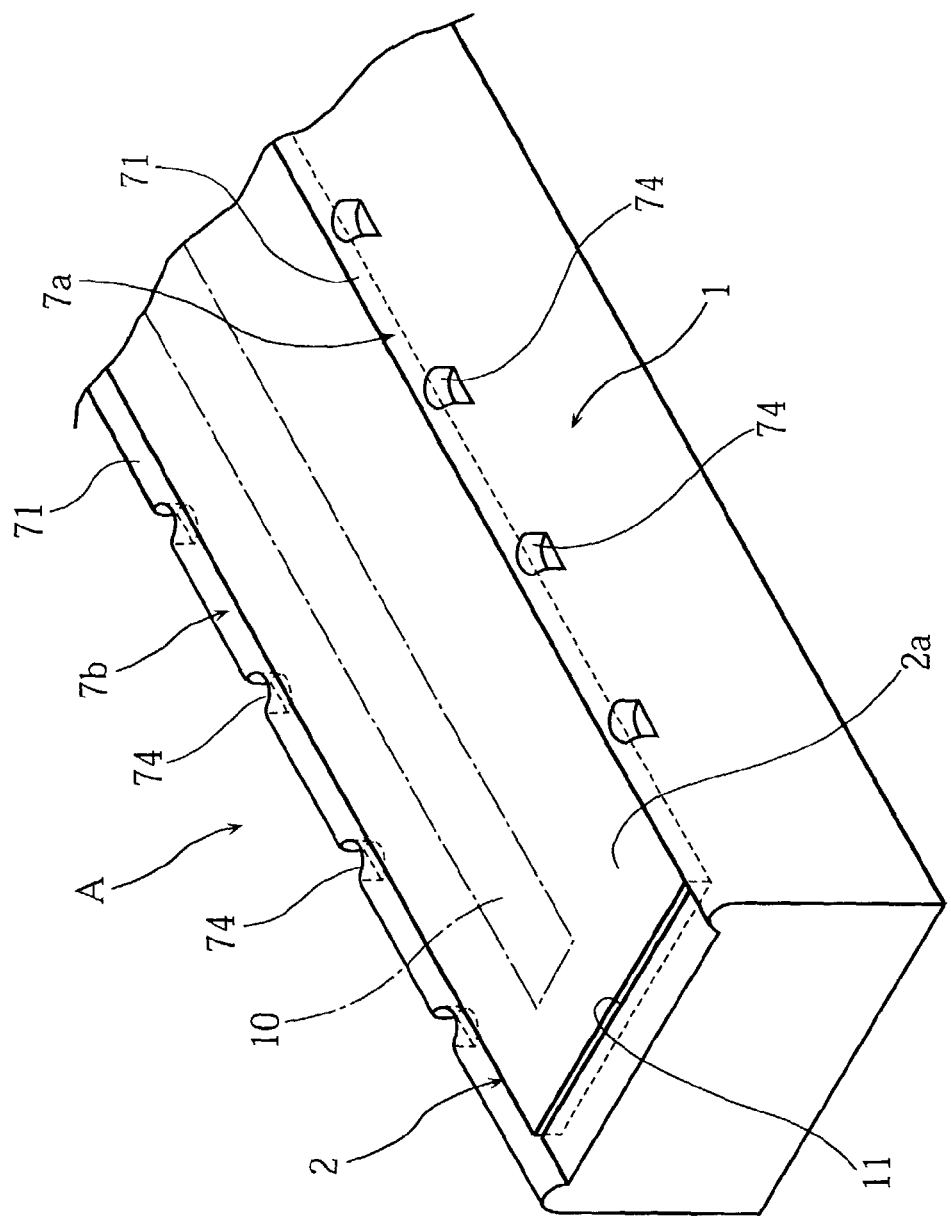
FIG. 1 is a perspective view illustrating a contact-type image sensor according to a preferable embodiment of the present invention.
Figure 2:
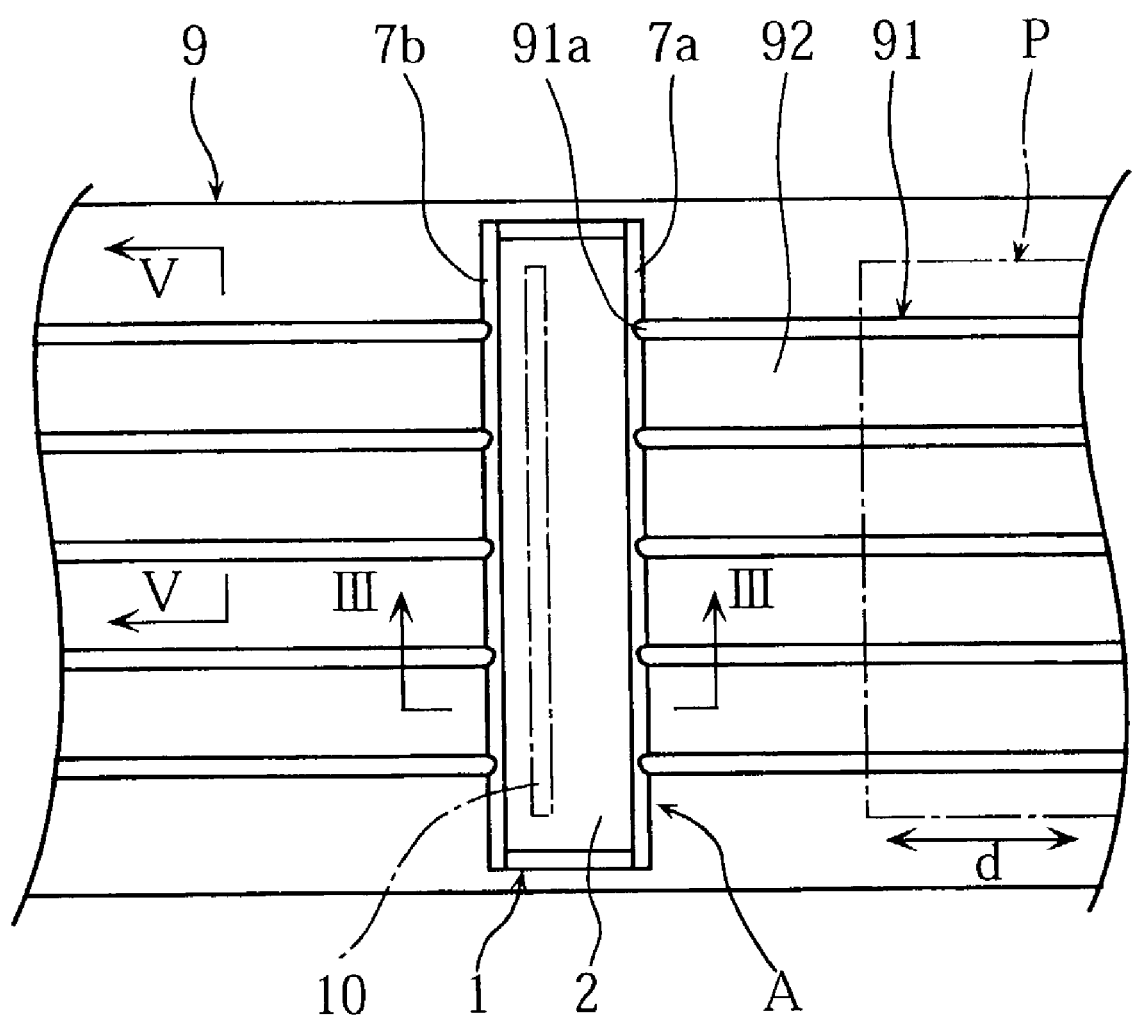
FIG. 2 is a plan view illustrating the contact-type image sensor shown in FIG. 1 which is placed in a transfer base.
Figure 3:
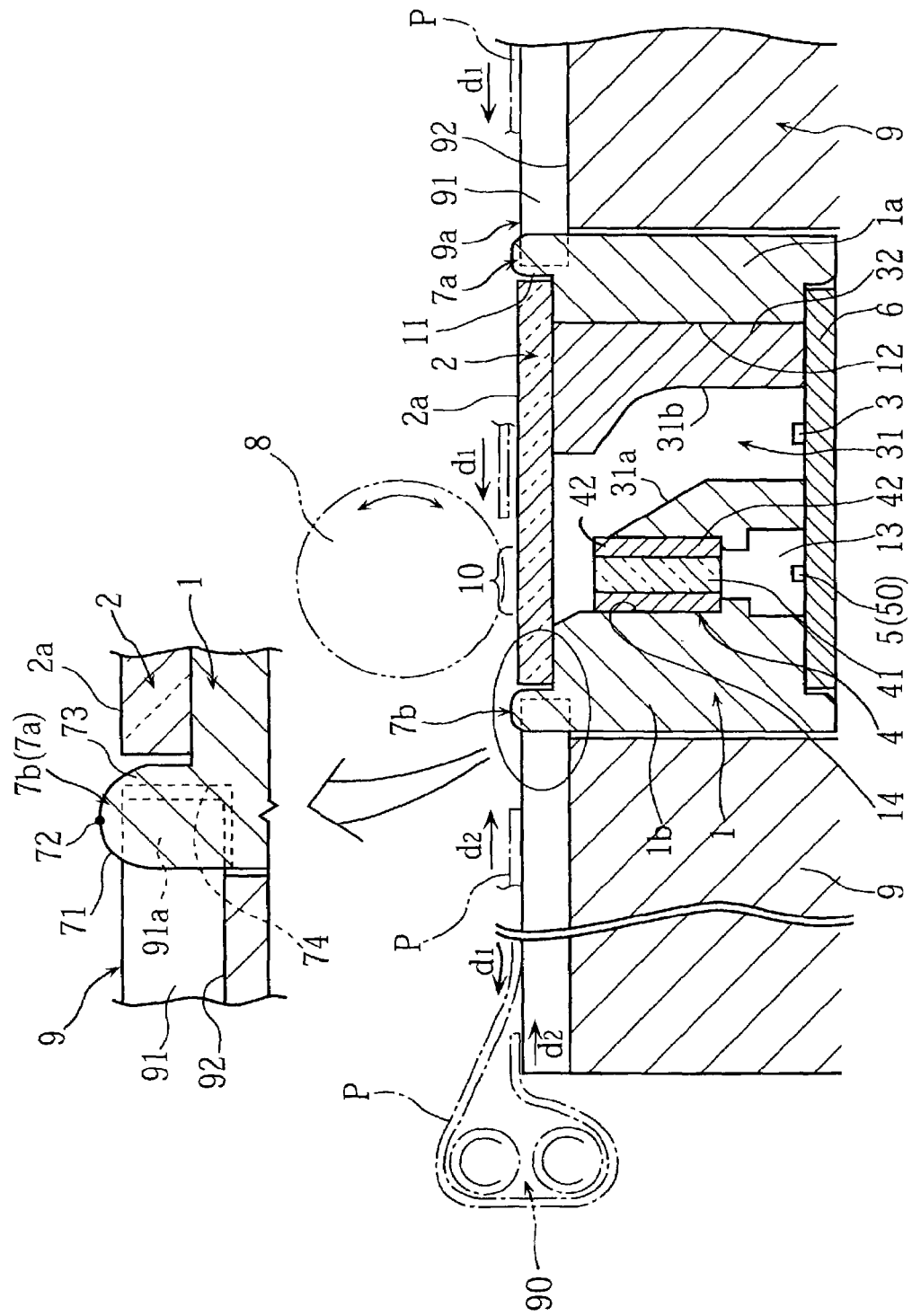
FIG. 3 is a sectional view taken along lines III—III in FIG. 2.

The contact-type image sensor according to a preferable embodiment of the present invention, which is generally designated by a reference A, is set in a copying machine or a scanner for example in order to read an image (including characters and symbols) on a sheet P as an object to be read (see in FIGS. 2 and 3). As illustrated in FIG. 1, the sensor A includes a cover glass 2 mounted on a case 1 as an outer covering. A surface 2a of the cover glass 2 is provided with a linear reading region 10 of a predetermined length. In the sensor A, the sheet P moves while coming into contact with the linear reading region 10. As shown in FIG. 3, the sensor A also includes a light source 3, a lens array 4, a plurality of sensor IC chips 5 and a substrate 6, in addition to the case 1 and the cover glass 2. As described below, the sensor IC chip 5 includes a plurality of photoelectric converters 50 arranged in an array parallel to the linear reading region 10. A primary scanning direction of the sensor A is the longitudinal direction of the linear reading region 10, whereas the secondary scanning direction of the sensor A is a direction in which the sheet P is transferred to the linear reading region 10.

As shown in FIG. 3, the case 1, which is the outer covering of the sensor A, is made of synthetic resin for example and is formed in a long narrow rectangle as a whole. The case 1 is provided with a primary space 12 in which the light source 3 is placed and a secondary space 13 in which the sensor IC chips 5 are placed. The primary space 12 and the secondary space 13 extend longitudinally of the sensor A. The primary space 12 extends through the thickness of the case 1, and at the top of it is a stepped opening 11 into which the cover glass is fitted.

Both sides of the opening 11 of the case 1 are provided with longitudinal edges 7a, 7b of the case 1. Each longitudinal edge 7a and 7b has an upper surface 71 which is convex upwardly. As shown in FIG. 3, the top 72 of the convex upper surface 71 of each edge 7a, 7b is positioned above the upper surface 2a of the cover glass. In the illustrated embodiment, the convex upper surface 71 has an arcuate cross section, and the line connecting the tops 72 of the respective edges 7a and 7b is parallel to the upper surface 2a of the cover glass 2. Further, the bottom portion 73 of the convex upper surface 71 of each edge 7a, 7b extends down to a position below the upper surface 2a of the cover glass 2.

The outer side of each edge 7a, 7b, as shown in FIG. 1, is formed with a plurality of recesses 74 arranged at a predetermined interval in the primary scanning direction.

When the sensor A is placed in a transfer base 9, as shown in FIGS. 2 and 3, each recess 74 engages with an end 91a of a guide projection 91 formed on the transfer surface 9a of a transfer base 9. Each recess 74 is the same as or slightly larger in size than the end 91a of the corresponding guide projection 91.

Referring to FIG. 1, the cover glass 2, made of transparent glass or synthetic resin such as acrylic resin, is formed into a long narrow strip, closing the opening 11 of the case 1. The upper surface 2a of the cover glass 2 is brought into contact with the sheet P (as shown in FIG. 3). The linear reading region 10 in the upper surface 2a of the cover glass 2 is located above the lens array 5.

The light source 3 for irradiating the linear reading region 10 is mounted on the same surface of the substrate 6 as the sensor IC chips 5. The light source 3 may include a plurality of light emitting elements arranged at a predetermined interval in the primary scanning direction. The light emitted from the light source 3 is led into a light guide 31 provided inside of the case 1, and then reflected by the surface of the sheet P at the linear reading region 10. In the primary space 12 of the case 1, there is disposed a reflector 32. The light guide 31 is defined by the inner surface 31b of the reflector 32 and the inner surface 31a of the primary space 12 opposite to the inner surface 31b. After reflecting the light emitted from the light source 3 with the surface 31a and 31b, the light guide 31 directs the light to the linear reading region 10.

The lens array 4 is used for an image formation, projecting the light, directed from the light source 3 to the linear reading region 10 and reflected by the sheet P, onto the photoelectric converters 50. The lens array 4 may have selfoc lenses 41 (self-focusing lenses) arranged in line and held by a holder 42 made of resin, to form the received image as an erected isometric image. The lens array 4 fitted into the groove 14 is placed in such a position that the light axis of each selfoc lens 41 extends at right angles to the receiving surface of the photoelectric converter 50. A convex lens or other kind of lenses can be used in stead of the selfoc lens 41.

Each sensor IC chip 5 is a semiconductor chip including integrated circuits provided with a plurality of photoelectric converters 50. Each photoelectric converter of the sensor IC chips 5 outputs a signal (an image signal) corresponding to the level of the quantity of the received light. The reading resolution of the sensor A (resolving power) is determined by the number of photoelectric converters 50 per unit length. For example, when the sensor A has 8 dot/mm. reading resolution, the sensor IC chip 5 includes eight photoelectric converters 50 per 1 mm.

The substrate 6 is made of epoxy resin or ceramic for example. The substrate 6 is fixed to the bottom of the case 1 so that the photoelectric converters 50 are arranged right below the lens array 4 and the light source 3 is arranged in the light guide 31.

Figure 5:
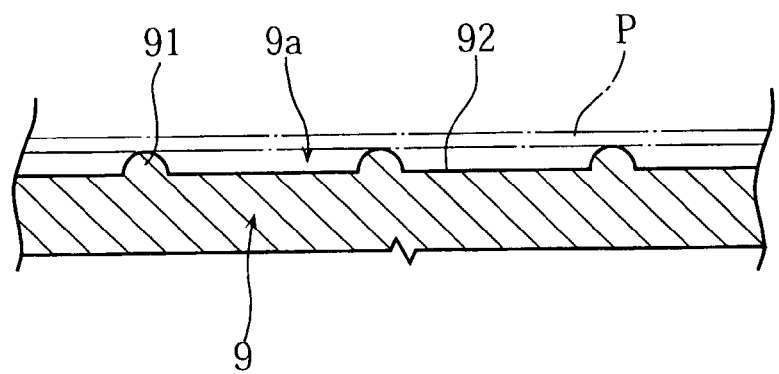
FIG. 5 is a sectional view taken along lines V—V shown in FIG. 2.

The sensor A, as shown in FIGS. 2 and 3, is placed in the transfer base 9 for transferring the sheet P. As shown in FIGS. 2 and 5, the transfer surface 9a of the transfer base 9, supporting the moving sheet P while coming in contact with it, extends longitudinally of the secondary scanning direction and is formed with the guide projections 91 which protrude from the plane surface 92 by the predetermined height. Each of the guide projections 91 has an even height in the secondary scanning direction of the sensor A. As described above, the end 91a is fitted in the corresponding recess 74 of the edges 7a and 7b.

The transfer base 9 is provided, at an edge, with a reversing device 90. The reversing device 90 turns over the sheet P transferred in the first direction $d_1$ and then transfers it back in the second direction $d_2$ which is reverse of the first direction $d_1$. This enables the sensor A to read both sides of the sheet P.

The sensor A has a platen roller 8 held in facing relation to the linear reading region 10. The platen roller 8 is rotatable backward and forward, pressing the sheet P against the linear reading region 10. The platen roller 8 transfers the sheet P reciprocally in the secondary scanning direction, while the sheet P is in contact with the linear reading region 10.

When placed in the transfer base 9, as shown in FIG. 2, the sensor A is arranged in such a position that the linear reading region 10 runs at right angles to the secondary scanning direction. As shown in FIG. 3, each longitudinal edge 7a, 7b is adjacent to the transfer surface 9a, and the top 72 of each edge 7a, 7b projects from the transfer surface 9a (i.e. each guide projection 91). The end 91a of each guide projection 91 of the transfer base 9 engages with the corresponding recess 74 formed in each edge 7a, 7b of the sensor A.

Figure 4A:
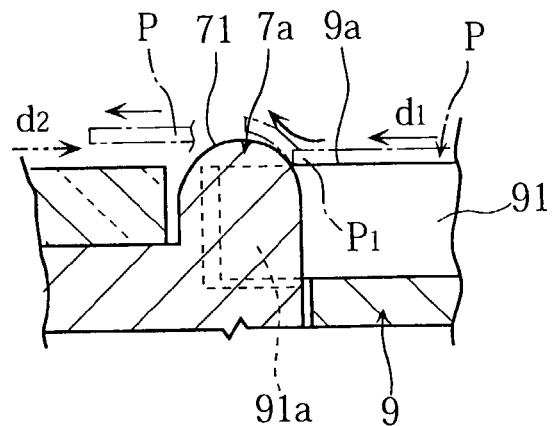
FIGS. 4a and 4b illustrate an operation of the contact-type image sensor shown in FIG. 1.
Figure 4B:
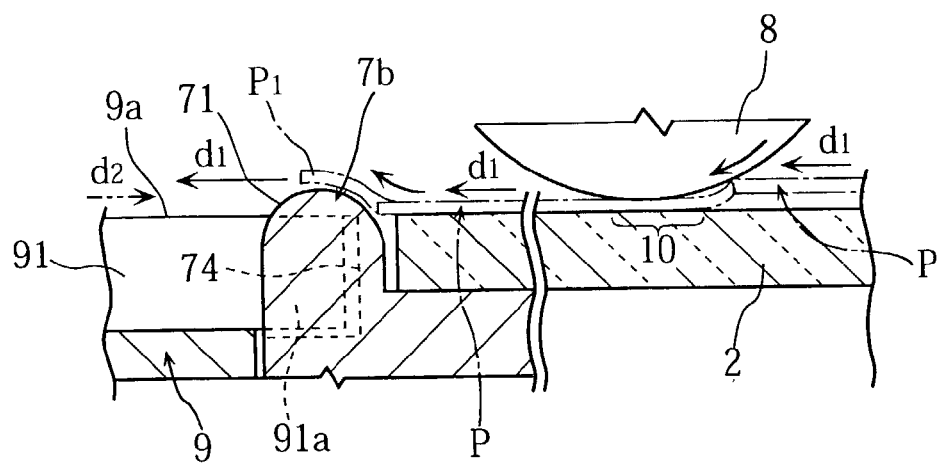

Now, the operation of the sensor A having the above-described arrangement will be explained with reference to FIGS. 3, 4a and 4b. As noted above, the sheet P is transferred in the backward direction $d_2$ after transferred in the forward direction $d_1$.

The sheet P transferred in the first direction $d_1$ reaches the sensor A while coming into contact with the transfer surface 9a, whereby the leading edge $P_1$ of the sheet P first abuts the edge 7a of the sensor A. At this time, as shown in FIG. 4a, the sheet P can smoothly slide over the curved surface 71 because the upper surface 71 of the edge 7a is convex upwardly, though the top 72 is positioned above the transfer surface 9a. In this manner, the sheet P can be transferred without being obstructed by the edge 7a of the sensor A.

Then the leading edge $P_1$ of the sheet P comes adjacent the linear reading region 10. As shown in FIG. 4b, the sheet P is continuously transferred in the forward direction $d_1$ by the rotating platen roller 8 while the sheet P comes into contact with the linear reading region 10. Therefore, the image on the sheet P can be read successively by the sensor A.

After passing by the linear reading region 10, the leading edge $P_1$ of the sheet P abuts the edge 7b of the sensor A while in contact with the upper surface of the cover glass 2. Since the upper surface 71 of the edge 7b is also convex upwardly, while the top 72 is positioned above the upper surface 2a of the cover glass 2, as shown in FIG. 4b, the sheet P can smoothly slide over the curved surface 71. It should be noted here that the convex upper surface 71 of the edge 7b extends up to below the upper surface 2a of the cover glass 2, which lifts the leading edge $P_1$ of the sheet P properly. Consequently, the sheet P can be transferred without being obstructed by the edge 7b of the sensor A.

The end 91a of the guide projection 91 of the transfer surface 9a is engaged with the recess 74 of the edge 7b. This enables the leading edge $P_1$ of the sheet P to move without abutting the end 91a of the guide projection 91. Consequently, the sheet P can be transferred without being obstructed by the end 91a of the guide projection 91.

After turned over by the reversing device 90, the sheet P moves in the backward direction $d_2$, with the reverse side facing downwardly. Therefore, an image on the reverse side of the sheet P can be read by the sensor A when the sheet P passes by the linear reading region 10. At this time, in passing by the edges 7b and 7a, the sheet P can be transferred without being obstructed by the edges 7b and 7a of the sensor A and the end 91a of the guide projection 91 due to the same process of transferring as in the first direction $d_1$. In the sensor A, the sheet P can be smoothly moved forward and backward in the secondary scanning direction of the linear reading region 10.

The preferred embodiment of the present invention being thus described, the present invention is not limited to this, and obvious modifications are to be included within the scope of the following claims.

The invention claimed is:

1. A contact-type image sensor comprising:
a case having an upper surface formed with an opening;
a cover glass closing the opening and providing a linear reading region extending in a primary scanning direction; the linear reading region coming into contact with a sheet as an object to be read, the sheet being reciprocally movable in a secondary scanning direction which is perpendicular to the primary scanning direction;
wherein the opening is defined by a pair of edges spaced in the secondary scanning direction;
wherein each of the edges includes a convex surface having a top which is positioned above an outer surface of the cover glass; and
wherein each of the edges includes a plurality of recesses that are open away from the cover glass for engagement with guide projections of a transfer base.

2. The contact-type image sensor according to claim 1, wherein the convex surface of each of the edges extends down to a position below the outer surface of the cover glass.

3. The contact-type image sensor according to claim 1, wherein the convex surface of each of the edges has an arcuate cross section.

4. The contact-type image sensor according to claim 1, wherein the plurality of recesses are arranged at a predetermined interval in the primary scanning direction.

5. The contact-type image sensor according to claim 4, wherein each of the recesses is also open upwardly.

6. An image reading apparatus comprising:
a transfer base having a transfer surface provided with guide projections upon which the sheet is transferred; and
a contact-type image sensor placed in the transfer base;
wherein the image sensor comprises:
a case having an upper surface formed with an opening;
a cover glass closing the opening and providing a linear reading region extending in a primary scanning direction;
the linear reading region coming into contact with a sheet as an object to be read, the sheet being reciprocally movable in a secondary scanning direction which is perpendicular to the primary scanning direction;
wherein the opening is defined by a pair of edges spaced in the secondary scanning direction;
wherein the top of each of the edges is positioned above an outer surface of the cover glass and the transfer surface; and
wherein each of the edges includes a plurality of recesses that are open away from the cover glass for engagement with the guide projections of the transfer base.

7. The image reading apparatus according to claim 6, wherein the convex surface of each of the edges extends down to a position below the transfer surface.

8. The image reading apparatus according to claim 6, wherein the guide projections are spaced at a predetermined interval in the primary scanning direction and extend in the secondary scanning direction.

9. The image reading apparatus according to claim 6, wherein the upper surface of each of the guide projections when held in engagement with a corresponding one of the recesses is positioned below the top of the convex surface of the edge.

10. An image reading apparatus comprising:
a transfer base having a transfer surface upon which the sheet is transferred; and
a contact-type image sensor placed in the transfer base; wherein the image sensor comprises:
a case having an upper surface formed with an opening;
a cover glass closing the opening and providing a linear reading region extending in a primary scanning direction; the linear reading region coming into contact with a sheet as an object to be read, the sheet being reciprocally movable in a secondary scanning direction which is perpendicular to the primary scanning direction;
wherein the opening is defined by a pair of edges spaced in the secondary scanning direction;
wherein the top of each of the edges is positioned above an outer surface of the cover glass and the transfer surface; and
wherein the transfer surface is provided by upper surfaces of guide projections which are spaced at a predetermined interval in the primary scanning direction and extend in the secondary scanning direction.

11. The image reading apparatus according to claim 10, wherein the upper surface of each of the guide projections when held in engagement with a corresponding recess is positioned below the top of the convex surface of the edge.

* * * * *